US006269380B1

(12) United States Patent
Terry et al.

(10) Patent No.: US 6,269,380 B1
(45) Date of Patent: Jul. 31, 2001

(54) PROPERTY BASED MECHANISM FOR FLEXIBILITY SUPPORTING FRONT-END AND BACK-END COMPONENTS HAVING DIFFERENT COMMUNICATION PROTOCOLS

(75) Inventors: Douglas B. Terry, San Carlos; James P. Dourish; Warren K. Edwards, both of San Francisco; Anthony G. LaMarca, Redwood City; John O. Lamping, Los Altos; Karin Petersen, Palo Alto; Michael P. Salisbury, Mountain View; James D. Thornton, Redwood City, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/143,778

(22) Filed: Aug. 31, 1998

(51) Int. Cl.[7] ............................. G06F 17/30; G06F 17/00
(52) U.S. Cl. ................... 707/200; 707/1; 707/10; 707/100; 707/104; 707/500; 707/514
(58) Field of Search ................ 707/1–10, 100–104, 707/200–206, 500–514, 526–531; 709/310; 705/1, 26, 54

(56) References Cited

U.S. PATENT DOCUMENTS

| 5,499,330 | * | 3/1996 | Lucas et al. | 707/514 |
|---|---|---|---|---|
| 5,528,739 | * | 6/1996 | Lucas et al. | 707/526 |
| 5,544,051 | * | 8/1996 | Senn et al. | 707/3 |
| 5,600,833 | * | 2/1997 | Senn et al. | 707/1 |
| 5,613,134 | * | 3/1997 | Lucas et al. | 707/526 |
| 5,621,874 | * | 4/1997 | Lucas et al. | 707/500 |
| 5,905,992 | * | 5/1999 | Lucas et al. | 707/514 |
| 5,982,891 | * | 11/1999 | Ginter et al. | 705/54 |
| 6,012,072 | * | 1/2000 | Lucas et al. | 707/526 |
| 6,012,074 | * | 1/2000 | Lucas et al. | 707/531 |
| 6,112,181 | * | 8/2000 | Shear et al. | 705/1 |
| 6,144,975 | * | 11/2000 | Harris et al. | 707/901 |

OTHER PUBLICATIONS

Lifestreams: Organizing Your Electronic Life, Freeman et al., (Yale University, Dept of Computer Science).
Semantic File Systems, Gifford et al., (Programming Systems Research Group, 1991 ACM 0–89791–447–3/91/0009/0016).

(List continued on next page.)

*Primary Examiner*—Hosain T. Alam
*Assistant Examiner*—Ella Colbert
(74) *Attorney, Agent, or Firm*—Fay, Sharpe, Fagan, Minnich & McKee, LLP

(57) ABSTRACT

In a computer system having a number of applications and storage repositories using protocols which are different from each other, a document management system is interposed into a content and/or property read/write path of the computer system. The document management system provides for attachment of properties to documents, which allow for separating the content of the document from the properties which describe the document. This separation of the document content from its properties allows for a user level access and control of documents providing for flexibility in organizing, storing and retrieving documents. Further, interface mechanisms are provided which allow the different applications and storage repositories to interact with the document management system. The interface mechanisms include translators and bit providers. The bit providers are configured with the translators and mechanisms to retrieve document content from the different storage repositories and to deliver the document content to a requesting document. The foregoing configuration allows a user to arrange collections of documents irrespective of where the document content is stored. The properties are user and document specific in the sense that they are associated with the user which attached the properties and are directed to control of specific documents.

21 Claims, 4 Drawing Sheets

OTHER PUBLICATIONS

The Digital Library Integrated Task Enironment (DLITE), Cousins et al., (Stanford University / Xerox PARC).

A Pile Metaphor for Supporting Casual Organization of Information, Mander et al., (Chi '92, 1992 ACM 0-89791-513-5/92/0005-0627).

Representing Information About Files, Jeffrey Mogul, (Computer Science Dept., Stanford University, CH2021-4/84/0000/0432$01.00 1984 IEEE).

Interposition Agents: Transparently Interposing User Code at the System Interface, Michael B. Jones, (Microsoft Corp.) Proceedings of the 14th ACM Symposium Operating System Principles, pp. 80 –90; 1993.

Lifestreams: Organizing Your Electronic Life, Freeman et al., (Yale University, Dept of Computer Science) Proceedings of the CHI 96 Conference Companion on Human Factors in Computing Systems, pp. 410 –411; 1995.

The Digital Library Integrated Task Enironment (DLITE), Cousins et al., (Stanford University / Xerox PARC) Jul. 1997.

Semantic File Systems, Gifford et al., (Programming Systems Research Group, 1991 ACM 0-89791-447-3/91/0009/0016).

Slic: An Extensible System For Commodity Operating System, Ghormley et al., Feb. 1998 (Computer Science Div., Univ. of CA at Berkley).

* cited by examiner

PROPERTY BASED MECHANISM FOR FLEXIBILITY SUPPORTING FRONT-END AND BACK-END COMPONENTS HAVING DIFFERENT COMMUNICATION PROTOCOLS

The following applications are related to the present application:

U.S. Ser. No. 09/143,802, Anthony G. LaMarca, et al., entitled USER LEVEL ACCESSING OF LOW-LEVEL COMPUTER SYSTEM OPERATIONS; U.S. Ser. No. 09/143,551, Karin Petersen, et al., entitled PROPERTY-BASED USER LEVEL DOCUMENT MANAGEMENT; U.S. Ser. No. 09/144,143, Warren K. Edwards, et al., entitled ATOMIC AND MOLECULAR DOCUMENTS; U.S. Ser. No. 09/143,555, Michael P. Salisbury, et al, entitled VIRTUAL DOCUMENTS; U.S. Ser. No. 09/144,383, John O. Lamping, et al, entitled SELF CONTAINED DOCUMENT MANAGEMENT BASED ON DOCUMENT PROPERTIES; U.S. Ser. No. 09/143,773, James D. Thornton, et al., entitled SERVICE INTERACTION USING PROPERTIES ATTACHED TO DOCUMENTS; U.S. Ser. No. 09/144,231, James P. Dourish, et al., entitled ACTIVE PROPERTIES FOR DYNAMIC SYSTEM CONFIGURATION; U.S. Ser. No. 09/143,777, Warren K. Edwards, et al., entitled EXTENDING APPLICATION BEHAVIOR THROUGH DOCUMENT PROPERTIES; U.S. Ser. No. 09/143,772, Michael P. Salisbury, et al., entitled MAINTAINING DOCUMENT IDENTITY ACROSS FILE SYSTEM INTERFACES; U.S. Ser. No. 09/144,032, Anthony G. LaMarca, et al, entitled CLUSTERING RELATED FILES IN A DOCUMENT MANAGEMENT SYSTEM.

Each of the above applications filed Aug. 31, 1998 and assigned to a common assignee are hereby incorporated by reference.

BACKGROUND OF THE INVENTION

The inventors have recognized that a large amount of a user's interaction with a computer has to do with document management, such as storing, filing, organizing and retrieving information from numerous electronic documents. These documents may be found on a local disc, on a network system file server, an e-mail file server, the world wide web, or a variety of other locations. Modern communication delivery systems have had the effect of greatly increasing the flow of documents which may be incorporated within a user's document space, thereby increasing the need for better tools to visualize and interact with the accumulated documents.

The present invention is directed to a document management system having a distributed document infrastructure where documents are organized and managed in terms of properties attached to documents. The invention is particularly concerned with mechanisms for unifying the instructions received from a variety of sources having different protocols, and unifying the presentation of data retrieved from a variety of storage repositories having different protocols. Such mechanisms allow for manipulation of documents within the document management system in a simplified manner, not requiring users to understand specific characteristics of a plurality of different applications and/or storage repositories which interact with the document management system. The mechanisms further remove the need for the user and/or documents to know where the contents of documents were retrieved.

Instruction input and data collection mechanisms have been implemented in the area of document management, however, various shortcomings exist. For example, for existing data management, if a user wishes to generate a collection of documents from different locations, such as a file system, an e-mail server, the World Wide Web (WWW), or other systems having distinct storage protocols, there is no easy direct manner to obtain such a collection. There is no unified system to issue requests for these documents and no unified system to retrieve the contents of these documents from the distinct storage repositories (i.e., it would be necessary to use different applications to initiate requests to retrieve documents existing in distinct systems and to access the different storage repositories). Thus, no common document layer is provided in the document management area wherein simple interaction between documents from distinct systems is possible.

To obtain such a collection in existing systems, a user needs to implement a variety of search and retrieval mechanisms simply to obtain the documents. Thereafter, once the documents are retrieved the user needs to reformat the documents (if even possible) into ones having similar protocols.

The present invention intends to overcome these deficiencies with a document management system which includes a common document layer where a user has the ability to issue requests for documents from systems having different protocols. The document management system includes a mechanism for unifying the receipt of requests for such distinct documents and a retrieval mechanism for unifying the retrieval of the contents for such distinct documents. This system thereby allows for the generation of collections from a variety of storage hierarchies with different protocols in an easy and efficient manner for a user who is unaware of the location from which the document contents were retrieved.

The most common tools for organizing a document space rely on a single fundamental mechanism known as hierarchical storage systems, wherein documents are treated as files that exist in directories or folders, which are themselves contained in other directories, thereby creating a hierarchy that provides the structure for document space interactions. Each directory in a hierarchy of directories, will commonly contain a number of individual files. Typically, files and directories are given alpha-numeric, mnemonic names in large storage volumes shared via a network. In such a network, individual users may be assigned specific directories.

A file located in a sub-directory is located by its compound path name. For example, the character string D:\TREE\LIMB\BRANCH\TWIG\LEAF.FIL could describe the location of a file LEAF.FIL whose immediate directory is TWIG and which is located deep in a hierarchy of files on the drive identified by the letter D. Each directory is itself a file containing file name, size, location data, and date and time of file creation or changes.

Navigation through a file system, to a large degree, can be considered as navigation through semantic structures that have been mapped onto the file hierarchy. Such navigation is normally accomplished by the use of browsers and dialog boxes. Thus, when a user traverses through the file system to obtain a file (LEAF.FIL), this movement can be seen not only as a movement from one file or folder to another, but also as a search procedure that exploits features of the documents to progressively focus on a smaller and smaller set of potential documents. The structure of the search is mapped onto the hierarchy provided by the file system, since the hierarchy is essentially the only existing mechanism available to organize files. However, documents and files are not the same thing.

Since files are grouped by directories, associating a single document with several different content groupings is cumbersome. The directory hierarchy is also used to control the access to documents, with access controls placed at every node of the hierarchy, which makes it difficult to grant file access to only one or a few people. In the present invention, separation of a document's inherent identity from its properties, including its membership in various document collections, alleviates these problems.

Other drawbacks include that existing hierarchical file systems provide a "single inheritance" structure. Specifically, files can only be in one place at a time, and so can occupy only one spot in the semantic structure. The use of links and aliases are attempts to improve upon such a limitation.

Thus, while a user's conception of a structure by which files should be organized may change over time, the hierarchy described above is fixed and rigid. While moving individual files within such a structure is a fairly straightforward task, reorganizing large sets of files is much more complicated, inefficient and time consuming. From the foregoing it can be seen that existing systems do not address a user's need to alter a file structure based on categories which change over time. At one moment a user may wish to organize the document space in terms of projects, while at some time in the future the user may wish to generate an organization according to time and/or according to document content. A strict hierarchical structure does not allow management of documents for multiple views in a seamless manner resulting in a decrease in the efficiency of document retrieval.

Existing file systems also support only a single model for storage and retrieval of documents. This means a document is retrieved in accordance with a structure or concepts given to it by its author. On the other hand, a user who is not the author may wish to retrieve a document in accordance with a concept or grouping different from how the document was stored.

Further, since document management takes place on a device having computational power, there would be benefits to harnessing the computational power to assist in the organization of the documents. For example, by attaching a spell-checker property to a document, it can extend the read operation of a document so that the content returned to the requesting application will be correctly spelled.

The inventors are aware that others have studied the area of document management/storage systems.

DMA is a proposed standard from AIIM designed to allow document management systems from different vendors to interoperate. The DMA standard covers both client and server interfaces and supports useful functionality including collections, versioning, renditions, and multiple-repository search. A look at the APIs show that DMA objects (documents) can have properties attached to them. The properties are strongly typed in DMA and must be chosen from a limited set (string, int, date . . . ). To allow for rich kinds of properties, one of the allowable property types is another DMA object. A list type is allowed to build up big properties. Properties have a unique IDs in DMA. Among the differences which exist to the present invention, is the properties are attached to documents without differentiation about which user would like to see them; properties are stored in the document repository that provides the DMA interface, not independently from it. Similarly, DMA does not provide support for active properties.

WebDAV is another interface designed to allow an extended uniform set of functionality to be attached with documents available through a web server. WebDAV is a set of extensions to the HTTP 1.1 protocol that allow Web clients to create and edit documents over the Web. It also defines collections and a mechanism for associating arbitrary properties with resources. WebDAV also provides a means for creating typed links between any two documents, regardless of media type where previously, only HTML documents could contain links. Compared to the present invention, although WebDAV provides support for collections, these are defined by extension (that is all components have to be explicitly defined); and although it provides arbitrary document properties, these live with the document itself and cannot be independently defined for different users, furthermore there is no support for active properties and are mostly geared toward having ASCII (or XML) values.

DocuShare is a simple document management system built as a web-server by Xerox Corporation. It supports simple collections of documents, limited sets of properties on documents and support for a few non-traditional document types like calendars and bulletin boards. It is primarily geared toward sharing of documents of small, self-defined groups (for the latter, it has support to dynamically create users and their permissions.) DocuShare has notions of content providers, but these are not exchangeable for a document. Content providers are associated with the type of the document being accessed. In DocuShare properties are static, and the list of properties that can be associated with a document depends on the document type. Users cannot easily extend this list. System administrators must configure the site to extend the list of default properties associated with document types, which is another contrast to the resent invention. Also, in DocuShare properties can be visible to anyone who has read access for the collection in which the document is in. Properties are tightly bound to documents and it is generally difficult to maintain a personalized set of properties for a document, again a different approach than the one described in the present invention.

An operating system "SPIN" from the University of Washington allows users to inject code into the kernel that is invoked when an appropriate system call or system state occurs. (For example, users can inject code that alters paging decisions.) If it has already been done, their technology could be used to make it possible to inject code into the file system to invoke a user's code on read and write. Among the differences between SPIN and the concepts of present invention are that code injected into SPIN runs at the kernel level and users can only express their behaviors in a restricted, safe language in which it is not possible to do "bad things." As such, expressiveness is limited. On the other hand, the properties in the present invention run at the user level, and can have GUIs call out to third party libraries and in general be far more expressive than a kernel injected spindle. Further, the properties of the present invention are expressed in terms of documents, as in "I attach property X to Document Y." The SPIN system, on the other hand, extends a system call such as "read" on all files. The example behaviors mentioned above are more easily mapped into a system such as the present invention in which properties are explicitly attached to individual documents.

Other work which allows operating system calls to be extended into user's code include, the article "Interposition Agents: Transparently Interposing User Code and System Interface," by Michael B. Jones in Proceedings of the 14th Symposium on Operating Systems, Principles, Asheville, N.C., December, 1993, pages 80–93. The article "SLIC: An Extensibility System for Commodity Operating Systems," by Douglas P. Ghormley, Steven H. Rodriguez, David Petrou, Thomas E. Anderson, which is to appear in the USENIX 1998 Annual Technical Conference, New Orleans, La., June 1998.

Further, the Windows NT (from Microsoft) has a function called "Filter Drivers" which, once installed, can see the accesses made to a file system. Installing filter drivers is a privileged operation, not available to normal users. As such, a user level mechanism, such as the document properties of the present invention and event dispatching architecture would be needed to allow users to express their desired behaviors.

There are also systems which, in a very specific domain, allow users to apply behaviors when documents are accessed. An example is the Tandem e-mail system, which has a "screen cobal" language and has hooks to find out when events occur. This system allows users to code filters to do custom operations when documents arrive and/or read. One of the differences between this system and the present invention, is that the Tandem system solves the problem in a specific domain and invokes only the user's behaviors when the documents are accessed via the mail application. In the present invention, the behaviors are invoked regardless of the application and regardless of the interface.

The paper, "Finding and Reminding: File Organization From the Desktop", D. Barreau and B. Nardi, SIGCHI Bulletin, 27 (3) July, 1995, reviews filing and retrieval practices and discusses the shortcomings of traditional file and retrieval mechanisms. The paper illustrates that most users do not employ elaborate or deep filing systems, but rather show a preference for simple structures and "location-based searches", exploiting groupings of files (either in folders, or on the computer desktop) to express patterns or relationships between documents and to aid in retrieval.

In response to the Barreau article, the article, "Find and Reminding Reconsidered", by S. Fertig, E. Freeman and D. Gelernter, SIGCHI Bulletin, 28(1) January, 1996, defends deep structure and search queries, observing that location-based retrieval is, "nothing more than a user-controlled logical search." There is, however, one clear feature of location-based searching which adds to a simple logical search—in a location-based system, the documents have been subject to some sort of pre-categorization. Additional structure is then introduced into the space, and this structure is exploited in search and retrieval.

The article "Information Visualization Using 3D Interactive Animation", by G. Robertson, S. Card and J. Mackinlay, Communications of the ACM 36 (4) April, 1993, discusses a location-based structure, an interesting feature is that it is exploited perceptually, rather than cognitively. This moves the burden of retrieval effort from the cognitive to the perceptual system. While this approach may be effective, the information that the systems rely on is content-based, and extracting this information to find the structure can be computationally expensive.

The article "Using a Landscape Metaphor to Represent a Corpus of Documents," Proc. European Conference on Spatial Information Theory, Elba, September, 1993, by M. Chalmers, describes a landscape metaphor in which relative document positions are derived from content similarity metrics.

A system, discussed in "Lifestreams: Organizing your Electronic Life", AAAI Fall Symposium: AI Applications in Knowledge Navigation on Retrieval (Cambridge, Mass.), E. Freeman and S. Fertig, November, 1995, uses a timeline as the major organizational resource for managing document spaces. Lifestreams is inspired by the problems of a standard single-inheritance file hierarchy, and seeks to use contextual information to guide document retrieval. However, Lifestreams replaces one superordinate aspect of the document (its location in the hierarchy) with another (its location in the timeline). The article "Semantic File Systems" by Gifford et al., Proc. Thirteenth ACM Symposium of Operating Systems Principals (Pacific Grove, Calif.) October, 1991, introduces the notion of "virtual directories" that are implemented as dynamic queries on databases of document characteristics. The goal of this work was to integrate an associating search/retrieval mechanism into a conventional (UNIX) file system. In addition, their query engine supports arbitrary "transducers" to generate data tables for different sorts of files. Semantic File System research is largely concerned with direct integration into a file system so that it could extend the richness of command line programming interfaces, and so it introduces no interface features at all other than the file name/query language syntax. In contrast, the present invention is concerned with a more general paradigm based on a distributed, multi-principal property-based system and with how interfaces can be revised and augmented to deal with it; the fact that the present invention can act as a file system is simply in order to support existing file system-based applications, rather than as an end in itself.

DLITE is the Stanford Digital Libraries Integrated Task Environment, which is a user interface for accessing digital library resources as described in "The Digital Library Integrated Task Environment" Technical Report SIDL-WP-1996-0049, Stanford Digital Libraries Project (Palo Alto, Calif.) 1996, by S. Cousins et al. DLITE explicitly reifies queries and search engines in order to provide users with direct access to dynamic collections. The goal of DLITE, however, is to provide a unified interface to a variety of search engines, rather than to create new models of searching and retrieval. So although queries in DLITE are independent of particular search engines, they are not integrated with collections as a uniform organizational mechanism.

Multivalent documents define documents as comprising multiple "layers" of distinct but intimately-related content. Small dynamically-loaded program objects, or "behaviors", activate the content and work in concert with each other and layers of content to support arbitrarily specialized document types. To quote from one of their papers, "A document management infrastructure built around a multivalent perspective can provide an extensible, networked system that supports incremental addition of content, incremental addition of interaction with the user and with other components, reuse of content across behaviors, reuse of behaviors across types of documents, and efficient use of network bandwidth."

Multivalent document behaviors (analogs to properties) extend and parse the content layers, each of which is expressed in some format. Behaviors are tasked with understanding the formats and adding functionality to the document based on this understanding. In many ways, the Multivalent document system is an attempt at creating an infrastructure that can deal with the document format problem by incrementally adding layers of "understanding" of various formats. In contrast, the present invention has an explicit goal of exploring and developing a set of properties that are independent of document format. While properties could be developed that could parse and understand content, it is expected that most will be concerned with underlying storage, replication, security, and ownership attributes of the documents. Included among the differences between the present invention and the Multivalent concepts are that, the Multivalent document system focuses on extensibility as a tool for content presentation and new content-based behaviors; the present invention focuses on extensible and incrementally-added properties as a user-visible notion to control document storage and management.

File systems known as the Andrew File System (AFS), Coda, and Ficus provide a uniform name space for accessing files that may be distributed and replicated across a number of servers. Some distributed file systems support clients that run on a variety of platforms. Some support disconnected file access through caching or replication. For example, Coda provides disconnected access through caching, while Ficus uses replication. Although the immediately described distributed file systems support document (or file) sharing, they have a problem in that a file's hierarchical pathname and its storage location and system behavior are deeply related. The place in the directory hierarchy where a document gets stored generally determines on which servers that file resides.

Distributed databases such as Oracle, SQL Server, Bayou, and Lotus Notes also support shared, uniform access to data and often provide replication. Like some distributed file systems, many of today's commercial databases provide support for disconnected operation and automatic conflict resolution. They also provide much better query facilities than file systems. However, distributed databases suffer the same problems as file systems in that the properties of the data, such as where it is replicated and how it is indexed and so on, are generally associated with the tables in which that data resides. Thus, these properties cannot be flexibly managed and updated. Also, the set of possible properties is not extensible.

A digital library system, known as the Documentum DocPage repository, creates a document space called a "DocBase." This repository stores a document as an object that encapsulates the document's content along with its attributes, including relationships, associated versions, renditions, formats, workflow characteristics, and security. These document objects can be infinitely combined and re-combined on demand to form "Virtual Documents": dynamic configurations of document objects that can come from any source.

DocPage supports organization of documents via folder and cabinet metaphors, and allows searching over both document content and attributes. The system also provides checkin/checkout-style version control, full version histories of documents, and annotations (each with its own attributes and security rules). The system also supports workflow-style features including notification of updates. DocBase uses a replicated infrastructure for document storage (see: http://www.documentum.com).

Among the key differences between Documentum DocPage and the present invention are: First, in the present system properties are exposed as a fundamental concept in the infrastructure. Further, the present system provides for a radically extensible document property infrastructure capable of supporting an aftermarket in document attributes. Documentum seems to be rather closed in comparison; the possible attributes a document can acquire are defined a priori by the system for a particular application environment and cannot be easily extended. Additionally, Documentum does not have the vision of universal access to the degree of the present invention which supports near-universal access to document meta-data, if not document content. In comparison, the scope of Documentum narrows to document access within a closed setting (a corporate intranet).

SUMMARY OF THE INVENTION

The present invention contemplates a new and improved document management system for use in a computer system, which includes a storage layer having at least two storage repositories that use protocols different from each other and an application layer having at least two applications which use protocols that are different from each other. The document management system is interposed within a communication channel of the computer system to intercept communications between the storage layer and the application layer. Translators are provided to facilitate communication between applications and storage repositories with the document management system. Properties which are attached to documents are configured to be initiated upon the interception of operation requests issued by the applications.

According to a more limited aspect of the present invention, the document management system is configured such that the applications and the storage repositories are unaware of the document management system or the properties.

With attention to yet another aspect of the present invention, the document management system is designed with a bit provider which is given a request from a document to retrieve that document's content stored in one of the storage repositories. The bit provider includes a translation mechanism (when the repository being requested uses a protocol different than that of the document management system). The bit provider delivers the content to the document in a manner such that the document is unaware of the location from which the content was obtained. According to yet another aspect of the present invention, since documents are unaware of the location of the content and the documents are all provided in a document management system format, collections of documents from a variety of dissimilar repositories can be obtained.

With attention to yet another aspect of the present invention, the user is provided with the ability to attach properties to the documents from a variety of dissimilar repositories, and a plurality of users may attach properties directed to content of the same base document.

Still other advantages and benefits will become apparent to those skilled in the art upon a reading and understanding of the following detailed description.

DESCRIPTION OF THE DRAWINGS

The invention may take physical form in certain parts and arrangement of parts, a preferred embodiment of which will be described in detail in this specification and illustrated in the accompanying drawings which form a part hereof, and wherein.

DETAILED DESCRIPTION OF THE PREFERRED EMBODIMENTS

Figure 1:
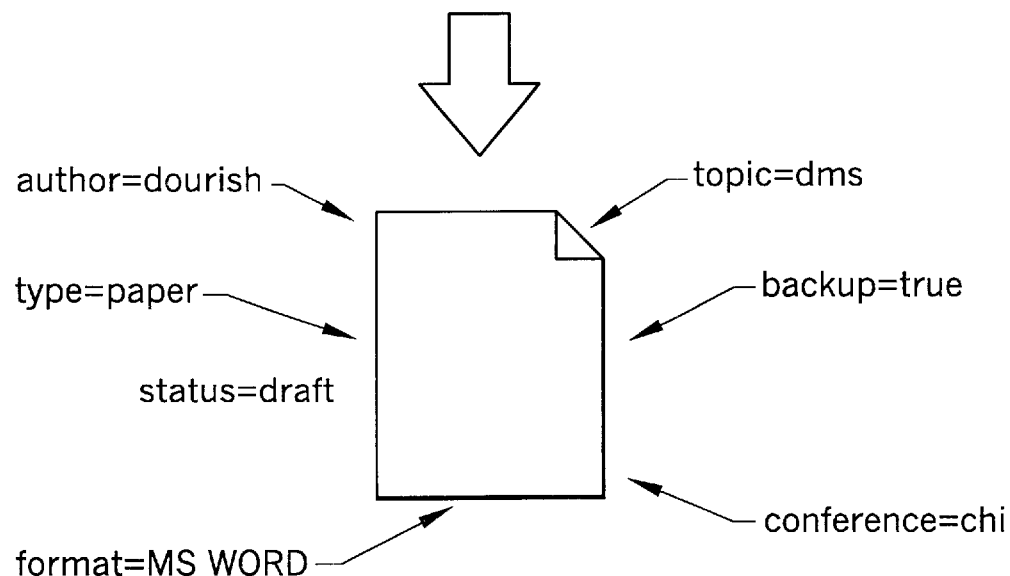
FIG. 1 shows a hierarchical storage mechanism compared to the concept of properties of the present invention.

Prior to discussing the present invention in greater detail, it is believed a glossary of terms used in the description would be beneficial. Therefore, the following definitions are set forth:

Action: The behavior part of a property.

Active Property: A property in which code allows the use of computational power to either alter the document or effect another change within the document management system.

Arbitrary: Ability to provide any property onto a document.

Base Document: Corresponds to the essential bits of a document. There is only one Base Document per document. It is responsible for determining a document's content and may contain properties of the document, and it is part of every principal's view of the document.

Base Properties: Inherent document properties that are associated with a Base Document.

Bit Provider: A special property of the base document. It provides the content for the document by offering read and write operations. It can also offer additional operations such as fetching various versions of the document, or the encrypted version of the content.

Browser: A user interface which allows a user to locate and organize documents.

Collection: A type of document that contains other documents as its content.

Combined Document: A document which includes members of a collection and content.

Content: This is the core information contained within a document, such as the words in a letter, or the body of an e-mail message.

Content Document: A document which has content.

Distributed: Capability of the system to control storage of documents in different systems (i.e., file systems, www, e-mail servers, etc.) in a manner invisible to a user. The system allows for documents located in multi-repositories to be provided to a principal without requiring the principal to have knowledge as to where any of the document's content is stored.

DMS: Document Management System

Document: This refers to a particular content and to any properties attached to the content. The content referred to may be a direct referral or an indirect referral. The smallest element of the DMS. There are four types of documents; Collection, Content Document, No-Content Document and Combined Document.

Document Handle: Corresponds to a particular view on a document, either the universal view, or that of one principal.

DocumentID: A unique identifier for each Base Document. A Reference Document inherits the DocumentID from its referent. Document identity is thus established via the connections between Reference Document References and Base Documents. Logically, a single document is a Base Document and any Reference Documents that refer to it.

Kernel: Manages all operations on a document. A principal may have more than one kernel.

Multi-Principal: Ability for multiple principals to have their own set of properties on a Base Document wherein the properties of each principal may be different.

Notification: Allows properties and external devices to find out about operations and events that occur elsewhere in DMS.

No Content Document: A document which contains only properties.

Off-the-Shelf Applications: Existing applications that use protocols and document storage mechanisms provided by currently existing operating systems.

Principal: A "User" of the document management system. Each person or thing that uses the document management system is a principal. A group of people can also be a principal. Principals are central because each property on a document can be associated with a principal. This allows different principals to have different perspectives on the same document.

Property: Some bit of information or behavior that can be attached to content. Adding properties to content does not change the content's identity. Properties are tags that can be placed on documents, each property has a name and a value (and optionally a set of methods that can be invoked).

Property Generator: Special case application to extract properties from the content of a document.

Reference Document: Corresponds to one principal's view of a document. It contains a reference to a Base Document (Reference Document A refers to Base Document B) and generally also contains additional properties. Properties added by a Reference Document belong only to that reference; for another principal to see these properties, it must explicitly request them. Thus, the view seen by a principal through his Reference Document is the document's content (through the Base Document), and a set of properties (both in the reference and on the Base Document). Even an owner of a Base Document can also have a Reference Document to that base, in which he places personal properties of the document that should not be considered an essential part of the document and placed in all other principal's view.

Space: The set of documents (base or references) owned by a principal.

Static Property: A name-value pair associated with the document. Unlike active properties, static properties have no behavior. Provides searchable meta-data information about a document.

Introduction

As discussed in the background of the invention, the structure that file systems provide for managing files becomes the structure by which users organize and interact with documents. However, documents and files are not the same thing. The present invention has as an immediate goal to separate management of properties related to the document or concerning the document from the management of the document content. Therefore, user-specific document properties are managed close to the document consumer or user of the document rather than where the document is stored. Separation of the management of user properties from the document content itself provides the ability to move control of document management from a closed file system concept to a user-based methodology.

FIG. 1 illustrates a distinction between hierarchical storage systems whose documents are organized in accordance with their location described by a hierarchical structure and the present invention where documents are organized according to their properties (e.g. author=dourish, type=paper, status=draft, etc.). This means documents will retain properties even when moved from one location to another, and that property assignment can have a fine granularity.

Figure 2:
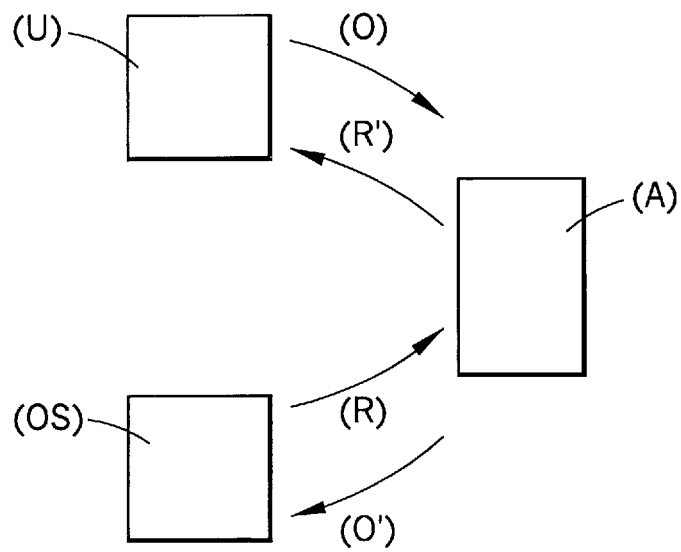
FIG. 2 is a block diagram of a document management system according to the present invention, interposed within a communication channel between a user and an operating system.

To integrate properties within the document management system of the present invention, the properties need to be presented within the content and/or property read/write path of a computer system, with the ability to both change the results of an operation as well as take other actions. The outline of the concept is described in FIG. 2, where once user (U) issues an operation request (O), prior to that operation being performed by operating system (OS), a call is made to document management system (DMS) A of the present invention, which allows DMS A to function so as to achieve the intended concepts of the present invention. This includes having DMS A interact with operating system (OS), through its own operation request (O'). Once operation request (O') is completed, the results are returned (R) to DMS A which in turn presents results (R') to user (U).

With these basic concepts having been presented, a more detailed discussion of the invention is set forth below.

Document Management System (DMS) Architecture

Figure 3:
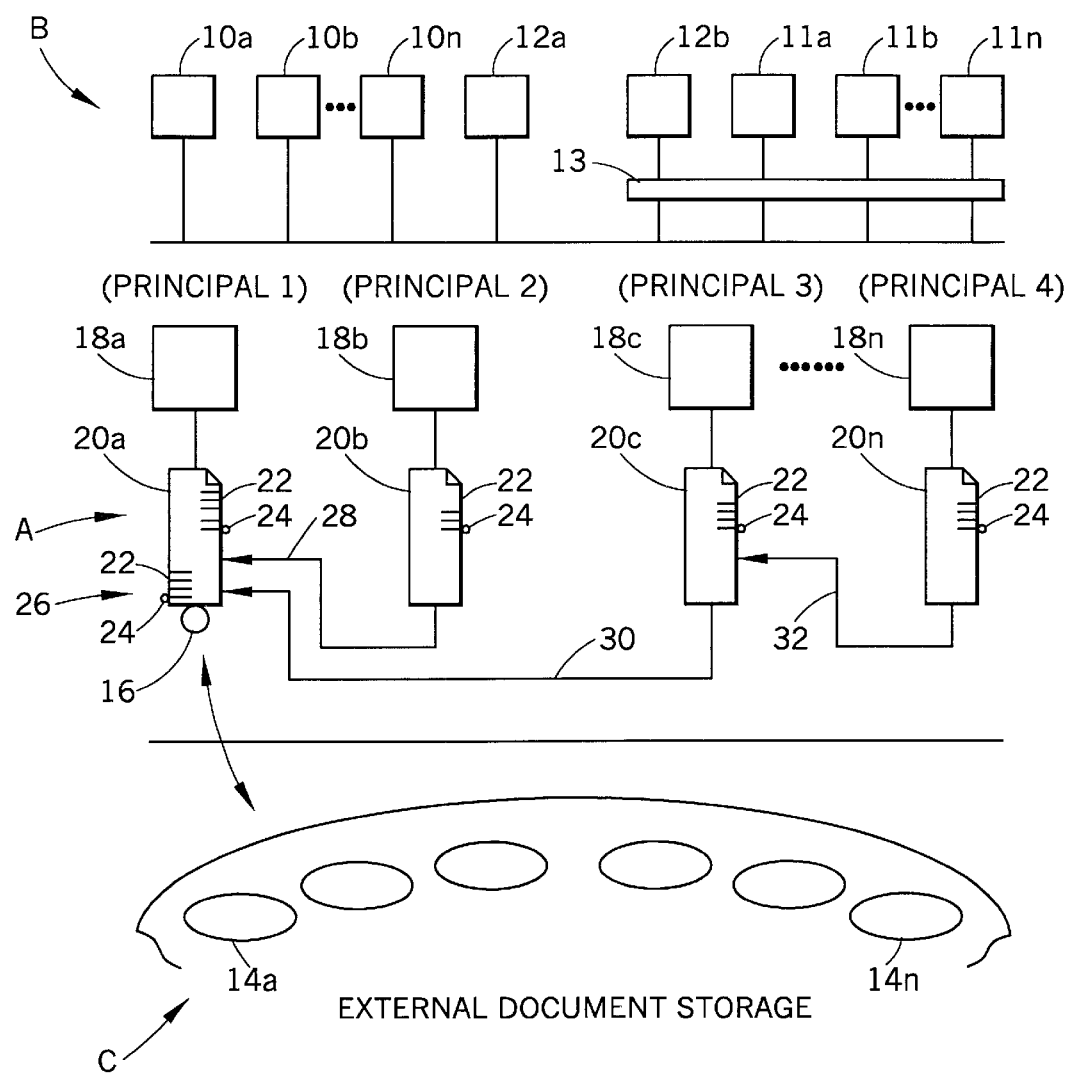
FIG. 3 is a representation of a document management system of the present invention implemented in a computer system.

FIG. 3 sets forth the architecture of a document management system (DMS) A of the present invention in greater detail.

Document management system (DMS) A is shown configured for operation with front-end components B, and back-end components C. Front-end components B include applications 10a–10n and 11a–11n, such as word processing applications, mail applications among others. Some of the applications are considered DMS aware 10a–10n which means these applications understand DMS protocols for storing, retrieving and otherwise interacting with DMS A. Other components are considered non-DMS aware 11a–11n. Browsers 12a (DMS aware) and 12b (non-DMS aware) are considered specialized forms of applications. In order for the non-DMS-aware applications 11a–11n and 12b to be able to communicate with DMS A, front-end translator 13 is provided.

Similarly, back-end components C can include a plurality of repositories 14a–14n, where the content of documents are stored. Such repositories can include the hard disc of a principal's computer, a file system server, a web page, a dynamic real time data transmission source, as well as other data repositories. To retrieve data content from repositories 14a–14n, bit providers such as bit provider 16 are used. These bit providers are provided with capability to translate appropriate storage protocols.

Principals 1-n each have their own kernel 18a–18n for managing documents, such as documents 20a–20n. Documents 20a–20n are considered to be documents the corresponding principal 1-n has brought into its document management space. Particularly, they are documents that a principal considers to be of value and therefore has in some manner marked as a document of the principal. The document, for example, may be a document which the principal created, it may be an e-mail sent or received by the principal, a web page found by the principal, a real-time data input such as an electronic camera forwarding a continuous stream of images, or any other form of electronic data (including video, audio, text, etc.) brought into the DMS document space. Each of the documents 20a–20n have static properties 22 and/or active properties 24 placed thereon.

Document 20a, is considered to be a base document and is referenced by reference documents 20b–20c. As will be discussed in greater detail below, in addition to base document 20a having static properties 22 and/or active properties 24, base document 20a will also carry base properties 26 which can be static properties 22 and/or active properties 24 (Static properties are shown with a—and active properties are shown with a—o).

Reference documents 20b–20c are configured to interact with base document 20a. Both base documents and reference documents can also hold static properties 22 and/or active properties 24. When principals 2,3 access base document 20a for the first time, corresponding reference documents 20b–20c are created under kernels 18b–18c, respectively. Reference documents 20b–20c store links 28 and 30 to unambiguously identify their base document 20a. In particular, in the present invention each base document is stored with a document ID which is a unique identifier for that document. When reference documents 20b–20c are created, they generate links to the specific document ID of their base document. Alternatively, if principal n references reference document 20c, reference document 20n is created with a link 32 to reference document 20b of Principal 3. By this link principal n will be able to view (i.e. its document handle) the public properties principal 3 has attached to its reference document 20c as well as the base properties and public reference properties of base document 20a. This illustrates the concept of chaining.

The above described architecture allows for sharing and transmission of documents between principals and provides the flexibility needed for organizing documents. With continuing attention to FIG. 3, it is to be noted at this point that while links 28–30 are shown from one document to another, communication within DMS A is normally achieved by communication between kernels 18a–18n. Therefore, when DMS A communicates with either front-end components B, back-end components C, or communication occurs between principals within DMS A, this communication occurs through kernels 18a–18n. It is however, appreciated the invention will work with other communication configurations as well.

Using the described architecture, DMS A of the present invention does not require the principal to operate within a strict hierarchy such as in file or folder-type environments. Rather, properties 22,24 which are attached to documents allows a principal to search and organize documents in accordance with how the principal finds it most useful.

For instance, if principal 1 (owner of kernel 18a) creates a base document with content, and stores it within DMS A, and principal 2 (owner of kernel 18b) wishes to use that document and organize it in accordance with its own needs, principal 2 can place properties on Reference Document 20b. By placement of these properties, principal 2 can retrieve the base document in a manner different than that envisioned by principal 1.

Further, by interacting with browser 12, a principal may run a query requesting all documents having a selected property. Specifically, a user may run query language requests over existing properties.

Therefore, a point of the present invention is that DMS A manages a document space where properties are attached by different principals such that actions occur which are appropriate for a particular principal, and are not necessarily equivalent to the organizational structure of the original author of a document or even to other principals.

Another noted aspect of the present invention is that since the use of properties separates a document's inherent identity from its properties, from a principal's perspective, instead of requiring a document to reside on a single machine, documents in essence can reside on multiple machines (base document 20a can reside on all or any one of kernels 18a–18n). Further, since properties associated with a document follow the document created by a principal (for example, properties on document 20b of kernel 18b, may reference base document 20a), properties of document 20b will run on kernel 18b, even though the properties of document 20b are logically associated with base document 20a. Therefore, if a property associated with document 20b (which references base document 20a) incurs any costs due to its operation, those costs are borne by kernel 18b (i.e.

principal 2), since properties are maintained with the principal who put the properties onto a document.

Support for Native Applications

A DMS document interface provides access to documents as Java objects. Applications can make use of this interface by importing the relevant package in their Java code, and coding to the API provided for accessing documents, collections and properties. This is the standard means to build new DMS-aware applications and to experiment with new interaction models. DMS Browser 12 (of FIG. 3) can be regarded as a DMS application and is built at this level, the DMS document interface provides Document and Property classes, with specialized subclasses supporting all the functionality described here (such as collections, access to WWW documents, etc.). Applications can provide a direct view of DMS documents, perhaps with a content-specific visualization, or can provide a wholly different interface, using DMS as a property-based document service back-end.

Support for Off-the-Shelf Applications

Another level of access is through translators (such as translator 13 of FIG. 3). In an existing embodiment, a server implementing the NFS protocol is used as the translator. This is a native NFS server implementation in pure Java. The translator (or DMS NFS server) provides access to the DMS document space to any NFS client; the server is used to allow existing off-the-shelf applications such as Microsoft Word to make use of DMS documents; on PC's, DMS simply looks like another disk to these applications, while on UNIX machines, DMS A looks like part of the standard network filesystem.

Critically, though, what is achieved through this translator is that DMS A is directly in the content and property read/write path for existing or off-the-shelf applications. The alternative approach would be to attempt to post-process files written to a traditional filesystem by applications, such as Word, that could not be changed to accommodate DMS A. By instead providing a filesystem interface directly to these applications, it makes it possible to execute relevant properties on the content and property read/write path. Furthermore, it is ensured that relevant properties (such as ones which record when the document was last used or modified) are kept up-to-date. Even though the application is written to use filesystem information, the DMS database remains up to date, because DMS A is the filesystem.

As part of its interface to the DMS database layer, NFS provides access to the query mechanism. Appropriately formatted directory names are interpreted as queries, which appear to "contain" the documents returned by the query. Although DMS provides this NFS service, DMS is not a storage layer. Documents actually live in other repositories. However, using the NFS layer provides uniform access to a variety of other repositories (so that documents available over the Web appear in the same space as documents in a networked file system). The combination of this uniformity along with the ability to update document properties by being in the read and write path makes the NFS service a valuable component for the desired level of integration with familiar applications. It is to be appreciated that while a Java implementation, as well as a server implementing NFS protocol are discussed, these are only potential mechanisms of implementing the present invention, and other options are also available.

Static Properties

The simplest properties are tags on documents. For instance, "important" or "shared with Karin" are tag properties representing facets of the document that is relevant to a document user. Only slightly more complicated are properties that are name/value pairs. For instance, "author=kedwards" is a property whose name component is "author" and value component is "kedwards". There are two things to note about these properties in the present invention. The first is that there may be multiple properties with the same name. If a document has multiple authors, it might have multiple author properties. The second is that the property's value can be arbitrary data. Although we will typically use simple test strings in our examples, we can actually store arbitrary data, or even code, as property values in our implementations.

Properties are either directly associated with base documents or else grouped into document references that are associated with principals. Properties associated with the base document are base properties and are "published". The intent with published properties is to represent information inherent in a given document, such as its size or content type. Thus, any principal with access to the base document will be able to see or review the published properties. As such, users should not use published properties for personal information. For instance, if a property used by a principal is the property "interesting" (i.e. a user wishes to collect all documents which he has tagged with a property defined as "interesting"), such a property is rarely inherent.

Active Properties

The static properties described above attach data to documents. They record information which can subsequently be searched or retrieved. However, some properties of documents have consequences for the way in which users should interact with them, and for the behavior of those documents in interaction. Consider the property "private." Simply marking a document as private is generally not enough to ensure that the document will not be read by others. So the "private" property should be more than a tag; it should also be a means to control how the document is accessed.

The active property mechanism provides a means to provide behaviors such as that required by properties like "private" which affect not only the document's status but also its behavior. At the same time, active properties afford this sort of interactive control in a way that maintains the advantages of a property-based system: document-centric, meaningful to users, and controlled by the document consumer. Active properties can be attached to documents just like static properties, but they also contain program code which is involved in performing document operations.

All active properties have three essential features: a name, a value, and active methods. Thus, any property can be made active by giving it active methods. Even properties thought of as being static are in some ways active since their getValue and setValue methods are provided by their class object. The value of a property can be used by its active methods to store persistent data associated with the property.

In accordance with the foregoing, interaction with the document space is based on meaningful properties of documents, rather than the structure in which documents were filed. Using document properties in this manner means that interaction is more strongly connected to the user's immediate concerns and the task at hand rather than an extrinsic structure. In addition, the structure of the document space reflects changes in the state of documents, rather than simply their state when they were filed. However, collections still appear inside collections, and standard filing information—such as document ownership, modification dates, file types, etc.—are still preserved by the present system, appearing as document properties maintained by the infra-structure. Thus, a principal can recapture more traditional forms of structured interaction with document spaces.

Bit Providers

As previously noted, an aspect of the present invention is the separation of a document's properties from a document's content, and that a user is able to retrieve the content of a document existing at a location separate from the properties. The DMS A architecture used to implement this retrieval is illustrated in FIG. 3. Particularly, bit provider 16 acts as a mechanism to retrieve content from external storage repositories 14a–14n. Bit providers are also provided with the capability to translate appropriate protocols when necessary. The content which a bit provider is instructed to retrieve could be found in a World-Wide-Web page, a file system, e-mail server, or even dynamic data such as an electronic video feed, etc. Once content is retrieved, it is supplied to the requesting document layer in a form having a DMS document format. Use of bit providers allows DMS A to manage documents completely independently of how the documents are stored, i.e. where the content of base document 20a exists. Thus, a user or principal does not need to worry about where the bits of the content are actually existing. Rather, once within DMS A, a user or principal will simply view the content as a DMS A document and will perform management operations exactly the same way regardless of where the content is actually stored. This allows a single document management layer to run over a large variety of storage systems and storage architectures.

Bit providers work in terms of active properties. DMS A assigns responsibility for providing the document content to an active "bit provider" property. Code associated with the property handles all requests to read or write the document's content. This gives the property the ability to undertake additional kinds of activities. Among these are caching, meaning it can make a local copy of content that is otherwise stored remotely. A further activity is access control, where the bit provider is informed of the requester of each request, and can deny the request based on access control criteria. A further activity is configuration management. Particularly, since the bit provider mediates all requests for the document content, you can store the bits (if any) at any accessible place. Part of its decision of where to store them can be in response to configuration management information recorded in properties. Yet another activity of the bit provider is collections - - - specifically collections of documents - - - . For collections, the "content" is actually a collection of other documents, and a bit provider manages the record of that collection. Another feature of bit providers is that they are replaceable, i.e. a particular base document may change from one bit provider, to another having different capabilities.

Figure 4:
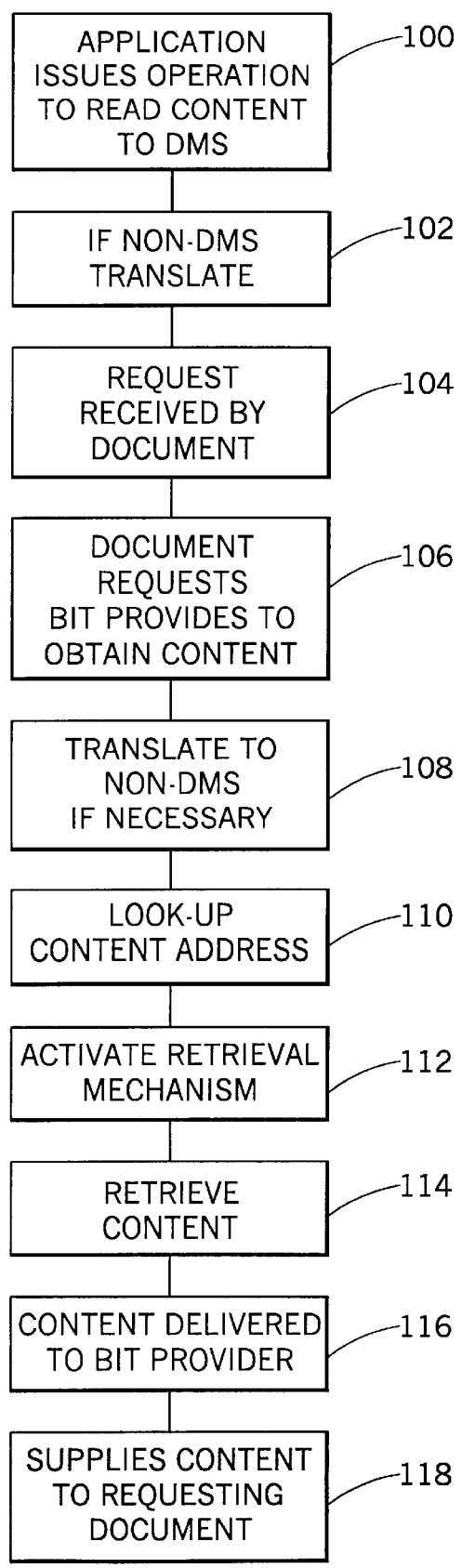
FIG. 4 is a flowchart showing retrieval of document content by a bit provider of the present invention.

Turning attention to FIG. 4, a flow chart of a request issued to DMS A requiring implementation of a bit provider is set forth.

An application issues a request to read the content of a document to DMS A (100). If this request is in a non-DMS-protocol, the request is translated (102). Thereafter the translated request (or the DMS-aware request) is received by the document (104). The document then forwards a request to its bit provider, asking for the content of the document (106). The bit provider knows the type of environment (WWW, hard disc, e-mail, etc.) in which the document content is stored and whether the requested document content can be obtained directly or whether a translation to a non-DMS-aware protocol is required (108). The translation step includes looking up the document content address for the known storage protocol (110). The bit provider then activates an appropriate retrieval mechanism to communicate with a storage system outside of DMS A (118). The storage system then retrieves the content (114) and returns it to the bit provider (116). Next, the retrieved content is supplied to the document whereby a user may view or otherwise manipulate the content of the document (118). From the foregoing, the procedures necessary for a request to write content are straightforward.

In the present embodiment the bit providers are configured to read/write content of a specific storage repository or system. It is to be appreciated however, that a bit provider which can read/write to a number of different storage systems is also possible.

As previously noted, bit providers are types of active properties which include at least the capability of knowing how to perform read/write content operations. Since it is in the form of a property, it is possible to attach bit providers to documents. The use of bit providers as its mechanism of retrieving data allows for a unified presentation of content to DMS A for document management.

Supporting Front-End and Back-End Components With Different Protocols

A powerful aspect of the present invention can be understood by the following example. It is presumed that a new database repository, which has never previously existed, is now developed. If, under existing document management systems, a user wishes to access a document in this database repository through their mail applications, collections, web browser, etc., then it would be necessary to actively change the mail operation, the collections, the word processor, the user is presently operating to understand the new access protocols of the database repository. In other words, the user will have to teach each of its different applications how to access the new database repository. However, once a bit provider for this new database is implemented within the DMS A system, then all other applications, which know how to get content into DMS A can use the new database file without having to be individually reconfigured.

Thus, in previous systems, it would be specific applications which would have to understand the new database access protocols. However, by implementation of a bit provider in DMS A, since it is the document which has the knowledge to obtain content, i.e. in the form of the bit provider, the knowledge required is moved down into the system below the applications such that the applications do not have to be changed and can run in their existing fashion.

In DMS A, an application issues an operation request such as a read operation to a document, and then the document will ask the bit provider to perform an activity necessary to accomplish the requested operation.

Another aspect of the present invention is that each base document has encapsulated within it (i.e. bit providers) a special way of obtaining the bits which form the contents of its documents. Therefore, the document defers or delegates to the bit provider the actual mechanism for retrieving the bits of the content.

Figure 5:
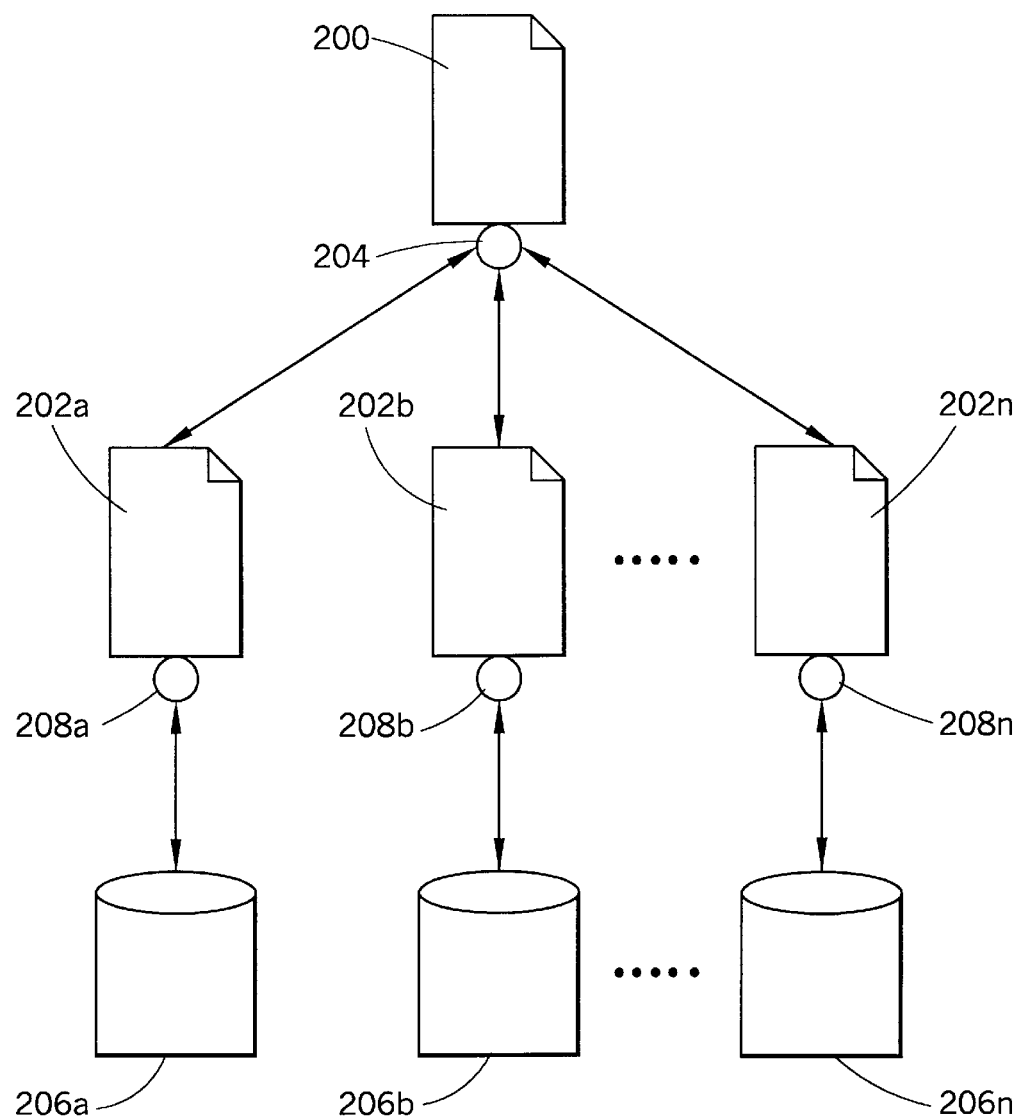
FIG. 5 depicts a document collection.

As previously noted, by having a unified manner of receiving content into DMS A, flexibility of the document management, not previously obtainable, is achieved. For example, in existing document management mechanisms, collections are represented in the same back-end repository as the files those collections contain. However, in DMS A, the representation of collections is separated from the representation of files. While file content can reside on a multiplicity of back-end repositories, collections exist solely as light-weight properties, and are stored close to the user of the documents. This concept is illustrated in FIG. 5 which shows collection document 200 comprised of documents 202a–202n, which were retrieved by its bit provider 204.

The content of collection document 200 is therefore the properties of documents 202a–202n which themselves have content in any of a number of different storage repositories 206a–206n retrievable by their bit providers 208a–208n. By this technique, collections are made "universal", that is, they can contain any type of content (web pages, normal files, mail messages, news postings, stock quotes, etc.), and they can be created by users even when no collection existed in the space created by the document producers.

However, in existing storage systems a "collection" of the documents is inherent in the back-end storage mechanism that represents the documents themselves, file systems define the semantics, not just of files, but also of the collections that contain those files (collections are "present" in the file system). Likewise, the WebDAV extensions to HTTP define collections in the same space as HTTP resources that can be thought of as documents.

On the other hand, DMS A collections are unique in that they can contain documents that reside in any back-end storage repository. This ability is a consequence of two facets of the DMS A architecture. First, DMS A can manage documents independently of the repository used to maintain the content of those documents. Second, DMS A collections are not made manifest in any back-end repository. They exist purely as properties on systems belonging to the document user.

The implications of this architecture are two-fold. First, users can create collections where none existed before. For example, a user can create a collection of web documents, for example, even if the provider of those documents has never implemented WebDAV.

Second, because DMS A documents reference their content through a replaceable bit provider, collections can contain documents whose content exist in multiple back-end repositories. Therefore users can create an "important" collection containing not only files, but also web pages, mail messages, calendar appointments, etc.

Most interactions in DMS A are with documents as elements of document collections. Along with file system documents and Web documents, document collections are implemented as a document type, and so they are subject to all the same operations that can be applied to documents (including having associated properties, search and retrieval, and themselves being members of collections).

In the present embodiment, document collections comprise three elements (each of which can be null). The first is a query term. Query terms are specified in terms of document properties. Queries can test for the presence or absence of particular properties on a document, can test the specific value of a property, or can perform type-specific value comparisons (for instance, a wide range of date specifications can be provided, such as "changed within 2 hours" and "modified last week"). Query terms in document collections are "live." The collection contains the matching documents at any moment, so that documents may appear or disappear depending on their immediate state.

In addition to the query term, the document collection stores two lists of documents, called the inclusion and exclusion lists. Documents in the inclusion list are returned as members of the collection whether or not they match the query. Documents in the exclusion list are not returned as members of the collection even if they do match the query. When the query is null, the inclusion list effectively determines the collection contents.

So, the contents of the collection at any moment are the documents in the inclusion list, plus those matching the query, minus those in the exclusion list. We call these three-part structures "fluid collections." The goal of this implementation of document collections is to support a natural style of document organization and retrieval. A query can be used to create an initial collection, or to specify the default membership. However, membership can be refined without having to reformulate the query, but by direct manipulation of the document collection contents. Items can be added and removed to override the results of the query, and these changes will be persistent. The browser also supports the direct manipulation of query terms, so that reformulating the query is a fairly straightforward operation.

The invention has been described with reference to the preferred embodiment. Obviously, modifications and alterations will occur to others upon reading and understanding this specification. It is intended to include all such modifications and alterations in so far as they come within the scope of the appended claims or the equivalents thereof.

Having thus described the present invention, we now claim:

1. A computer system comprising:
   a storage layer having at least two storage repositories which use storage protocols which are different from each other;
   a plurality of properties configured for attachment to a document, the properties providing a manner of identifying the document or undertaking a behavior related to the document;
   active properties of the plurality of properties, configured to provide a uniform mechanism by which content stored in the at least two storage repositories is accessed;
   an application layer having at least two applications which use operational protocols which are different from each other;
   a communication channel through which the storage layer and the application layer communicate; and
   a document management system interposed within the communication channel such that the document management system intercepts communications between the storage layer and the application layer, the document management system including an interface which provides application translators to allow the applications to communicate with the document management system.

2. The computer system according to claim 1 wherein a plurality of properties can be attached to the document independently of where the content of the document is stored and, where any of the properties are available as a basis for organization and retrieval of the document.

3. The computer system according to claim 2 further including a plurality of predefined operations which are embedded within the computer system when the computer system is designed, the properties being configured to be responsive to issuance of a request to undertake at least one of the operations.

4. The computer system according to claim 1 wherein the document management system is configured such that the applications and storage repositories operate without being aware of the document properties.

5. The computer system according to claim 1 wherein the document management system is configured to function with a plurality of users.

6. The computer system according to claim 5 wherein the properties are one of public or private, the public properties being viewable by any user of the document management system and the private properties being viewable only by the user that applied the private properties.

7. The computer system according to claim 1 wherein all aspects of document control are provided through properties.

8. The computer system according to claim 1 wherein there are multiple properties for the same characteristic or document behavior.

9. The computer system according to claim 1 wherein the applications and storage repositories include applications and storage repositories that understand a file hierarchy.

10. The computer system according to claim 1 wherein the documents of the computer system include arbitrary collections of documents that can hold documents whose contents are stored in different repositories from each other.

11. A method for managing documents in a computer system comprising the step of:

attaching, to a document within a document management system of the computer system, properties related to at least one of characteristics of and behaviors of the document, the attaching being accomplished by a user of the computer system activating an input device which delivers operation requests in the computer system, the requests coming from an application running in the computer system and requiring an access to a document content stored in a storage repository of the computer system;

determining whether the operation request is a type that can communicate with the document management system which is interposed between the application and the storage repository;

translating, by the document management system, the operation request when it is determined it is not of the type that can communicate with the document management system, to a type which can communicate;

intercepting the issued operation request by the document management system; and performing an operation including at least one of obtaining the document content based on at least one of the attached properties and performing some action based on another of the attached properties.

12. The method according to claim 11 wherein the translating step occurs within the document management system whereby the applications and storage repositories are unaware of the translations.

13. The method according to claim 11 wherein properties on a document are configured to be under the control of the user that attached the properties to the document, and the properties can be attached independently of where the content of the document is stored.

14. The method according to claim 11 wherein documents in the computer system include collections of documents, which are arbitrary collections that include documents whose contents are stored in different storage repositories.

15. A computer system comprising:

a front end including a plurality of applications, at least some of the applications having communication protocols different from each other;

a back end including a plurality of storage repositories, at least some of the storage repositories having communication protocols different from each other;

a communication path located between the front end and the back end, to allow communication between the front end and the back end;

a document management system interposed on the communication path between the front end and the back end, whereby the document management system intercepts communications between the front end and the back end;

a front end interface configured to allow each of the applications to communicate with the document management layer; and a back end interface configured to allow each of the storage repositories to communicate with the document management layer.

16. The computer system according to claim 15 wherein a bit provider includes:

a means for receiving a request to retrieve document content data stored in at least one of the storage repositories;

means to correlate a document id of the requested document content data to a content id indicating the location of the requested document content data in one of the storage repositories;

means for accessing the storage repository to retrieve the requested document content data;

a means for re-identifying the retrieved document content data with a document management system id; and a means for delivering the requested document content data in accordance with the request.

17. The computer system according to claim 16 wherein the request is originated by an application in the front end and is received by a document in the document management system.

18. The computer system according to claim 17 wherein the request for document content to the bit provider is issued by the document within the document management system.

19. The computer system according to claim 18 wherein the bit provider is carried on the document making the request.

20. The computer system according to claim 16 wherein the bit provider is replaceable.

21. The computer system according to claim 16 wherein the bit provider is configured such that the document making the request is without information as to where the document content data is stored.

* * * * *